(12) United States Patent
Okubi (10) Patent No.: US 11,373,414 B2
(45) Date of Patent: Jun. 28, 2022

(54) IMAGE PROCESSING SYSTEM, IMAGE PROCESSING DEVICE, IMAGE PROCESSING METHOD AND PROGRAM STORAGE MEDIUM

(71) Applicant: TOYOTA JIDOSHA KABUSHIKI KAISHA, Toyota (JP)

(72) Inventor: Ryota Okubi, Funabashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/953,835

(22) Filed: Nov. 20, 2020

(65) Prior Publication Data

US 2021/0174099 A1 Jun. 10, 2021

(30) Foreign Application Priority Data

Dec. 10, 2019 (JP) .............................. JP2019-223168

(51) Int. Cl.
*G06T 7/70* (2017.01)
*G06V 20/58* (2022.01)
*G06T 7/246* (2017.01)
*G06V 20/64* (2022.01)

(52) U.S. Cl.
CPC .............. *G06V 20/58* (2022.01); *G06T 7/248* (2017.01); *G06T 7/70* (2017.01); *G06V 20/64* (2022.01); *G06T 2207/30261* (2013.01)

(58) Field of Classification Search
CPC ...... G06K 9/000805; G06T 7/248; G06T 7/70
See application file for complete search history.

(56) References Cited

U.S. PATENT DOCUMENTS

| 6,321,147 | B1* | 11/2001 | Takeda | G05D 1/0038 |
| | | | | 180/167 |
| 2012/0081542 | A1* | 4/2012 | Suk | G06K 9/00805 |
| | | | | 348/139 |
| 2017/0278321 | A1 | 9/2017 | Nishida et al. | |

FOREIGN PATENT DOCUMENTS

| DE | 2212175 | * 10/2008 | .............. G08G 1/16 |
| JP | 2017-174244 A | 9/2017 | |

* cited by examiner

*Primary Examiner* — Myron Wyche
(74) *Attorney, Agent, or Firm* — Sughrue Mion, PLLC (57) ABSTRACT

An image processing system includes: a possibility determination unit that determines whether there is a possibility that an obstacle is shown in an image acquired by an image acquisition device of a vehicle; a transmitting unit that transmits, from the vehicle, image information of the acquired image if it has been determined that there is a possibility that an obstacle is shown therein; a receiving unit that receives the image information from vehicles; a processing unit that performs image processing to identify an obstacle shown in the acquired image; and a duplication determination unit that determines whether or not an identified obstacle, which has been identified in a previous acquired image, is shown in a subsequent acquired image received by the receiving unit, wherein the processing unit performs the image processing on the subsequent acquired image if the subsequent acquired image has been determined to not show the identified obstacle.

10 Claims, 10 Drawing Sheets

IMAGE PROCESSING SYSTEM, IMAGE PROCESSING DEVICE, IMAGE PROCESSING METHOD AND PROGRAM STORAGE MEDIUM

CROSS-REFERENCE TO RELATED APPLICATION

This application is based on and claims priority under 35 USC 119 from Japanese Patent Application No. 2019-223168 filed can Dec. 10, 2019, the disclosure of which is incorporated by reference herein.

BACKGROUND

Technical Field

The present disclosure relates to an image processing system that performs image processing, an image processing device, an image processing method, and a program storage medium.

Related Art

Japanese Patent Application Laid-open (JP-A) No. 2017-174244 describes an information processing device whose purpose is to provide suitable information to a vehicle that is a connected car, which is controlled based on recognition results obtained by an external field recognition device.

Here, if image processing is executed in the information processing device described in JP-A No. 2017-174244 on an image that has been acquired by a vehicle in order to identify an obstacle on the road, then the load on the information processing device increases in a case in which image processing is performed in the information processing device on all of the acquired images transmitted from the vehicle.

SUMMARY

The present disclosure provides an image processing system, an image processing device, an image processing, method, and a program storage medium that enable a processing load on a device that performs image processing to be reduced in cases in which information relating to an obstacle is collected based on images acquired by a vehicle.

A first aspect of the present disclosure is an image processing system that includes a possibility determination unit that determines whether there is a possibility that an obstacle is shown in an acquired image acquired by an image acquisition device provided at a vehicle; a transmitting unit that transmits, from the vehicle, image information relating to the acquired image in a case in which it has been determined by the possibility determination unit that there is a possibility that an obstacle is shown therein: a receiving unit that receives the image information from plural vehicles; a processing unit that performs image processing to identify an obstacle shown in the acquired image associated with the image information; and a duplication determination unit that determines whether or not an identified obstacle, which has been identified in a previous acquired image associated with previous image information, is shown in a subsequent acquired image associated with subsequent image information received by the receiving unit, wherein the processing unit performs the image processing on the subsequent acquired image in a case in which the subsequent acquired image has been determined by the duplication determination unit to not show the identified obstacle.

In the image processing system of the present aspect, in a device on a transmitting side, a possibility determination unit determines whether or not there is a possibility that an obstacle is shown in an acquired image, and in a device on a receiving side, a processing unit performs image processing to identify obstacles shown in an acquired image. Furthermore, in the device on the receiving side, a duplication determination unit determines whether or not an obstacle that has already been identified in a previous acquired image is shown in a newly received (i.e., subsequent) acquired image, and the processing unit executes image processing on the new acquired image that has been determined to not show already identified obstacles.

Image information relating to an acquired image that has been determined to show an obstacle, and position information attached to this acquired image are transmitted from the transmitting-side device to the receiving-side device. For this reason, according to this image processing system, it is possible to reduce the transmission quantity of image information transmitted to the receiving-side device performing the image processing, and to thereby reduce the processing load in this device. Additionally, according to this image processing system, with respect to the obstacle that has already been identified, because image processing is inhibited from being performed repeatedly on the same obstacle, it is possible to reduce the processing load in the receiving-side device performing the image processing.

In the first aspect, the receiving unit may receive the image information together with position information attached to the acquired image, and the duplication determination unit may at least determines whether or not the already identified obstacle is shown in the subsequent acquired image at a same position, as in the previous acquired image.

In the above-described structure, in the receiving-side device, the duplication determination unit makes a determination as to whether or not an already identified obstacle is shown in an acquired image by considering position information attached to the acquired image. According to this image processing system, because it is possible to improve the accuracy of identifying an obstacle, the processing load in the receiving-side device may be reduced.

In the first aspect, the receiving unit may receive other position information associated with another vehicle, and the system may further include: a proximity determination unit that determines whether the other vehicle having the other position information has approached the identified obstacle corresponding to the position information; and a notification unit that sends hazard information to the other vehicle in a case in which the proximity determination unit determines that the other vehicle has approached the identified obstacle.

In the above-described structure, the receiving unit receives position information for an acquired image and also other position information for another vehicle, and the proximity determination unit determines whether another vehicle has approached close to any obstacle that has been previously identified. If it is determined that the other vehicle has approached close to an obstacle that has been previously identified, the notification unit sends hazard information to the other vehicle. According to this image processing system, it is possible to direct the attention of a driver of the other vehicle towards an obstacle on the road based on position information for the obstacle.

A second aspect of the present disclosure is an image processing method including: determining whether there is a possibility that an obstacle is shown in an acquired image acquired by an image acquisition device provided at a vehicle; transmitting, from the vehicle to a server, image information relating to the acquired image in a case in which it has been determined that there is a possibility that the acquired mage shows an obstacle; receiving, by the server, the image information from plural vehicles; determining, by the server, whether or not an identified obstacle, which has been identified in a previous acquired image associated with previous image information, is shown in a subsequent acquired image associated with subsequent image information; and performing image processing to identify an obstacle shown in the subsequent acquired image in a case in which the subsequent acquired image has been determined to not show the identified obstacle.

A third aspect of the present disclosure is a non-transitory storage medium storing a program executable by a computer to perform an image processing, the image processing including: determining whether there is a possibility that an obstacle is shown in an acquired image acquired by an image acquisition device provided at a vehicle; transmitting, from the vehicle to a server, image information relating to the acquired image in a case in which it has been determined that there is a possibility that the acquired image shows an obstacle; receiving, by the server, the image information from plural vehicles; determining, by the server, whether or not an identified obstacle that has already been identified in a previous acquired image associated with previous image information is shown in a subsequent acquired image associated with subsequent image information; and performing image processing to identify an obstacle shown in the subsequent acquired image in a case in which the subsequent acquired image has been determined to not show the identified obstacle.

A fourth aspect of the present disclosure is an image processing device that includes a receiving unit that receives from plural vehicles image information relating to acquired images acquired by the plural vehicles, in which it has been determined that there is a possibility that an obstacle is shown in the acquired images; a processing unit that performs image processing to identify an obstacle shown in the acquired image associated with the image information; and a duplication determination unit that determines whether or not an identified obstacle, which has been identified in a previous acquired image associated with previous image information is shown in a subsequent acquired image associated with subsequent image information received by the receiving unit, wherein the processing unit performs the image processing on the subsequent acquired image in a case in which the subsequent acquired image has been determined by the duplication determination unit to not show the identified obstacle.

In the image processing device of the fourth aspect, the receiving unit receives from plura vehicles image information relating to acquired images of those vehicles in which it has been determined that there is a possibility that an obstacle is shown therein. In addition, in this image processing device, a duplication determination unit determines whether or not an obstacle that has already been identified in a previous acquired image is shown in a newly received (i.e., subsequent) acquired image, and the processing unit executes image processing to identify an obstacle on the newly acquired image that have been determined to not show any obstacle that have already been identified in a previous acquired image. For this reason, according to this image processing device, with respect to the obstacle has been already identified, because image processing is inhibited from being repeatedly executed on the same obstacle, it is possible to reduce the processing load in this device.

A fifth aspect of the present disclosure is an image processing method that includes: receiving from plural vehicles image information relating to acquired images acquired by the plural vehicles, in which it has been determined that there is a possibility that an obstacle is shown in the acquired images; determining whether or not an identified obstacle, which has been identified in a previous acquired image associated with previous image information, is shown in a subsequent acquired image associated with subsequent image information; and performing image processing to identify an obstacle shown in the subsequent acquired image in a case in which the subsequent acquired image has been determined to not show the identified obstacle.

A sixth aspect of the present disclosure is a non-transitory storage medium storing a program executable by a computer to perform image processing, the image processing including: receiving from plural vehicles image information relating, to acquired images acquired by the plural vehicles, in which it has been determined that there is a possibility that an obstacle is shown in the acquired images; determining whether or not an identified obstacle, which has been identified in a previous acquired image associated with previous image information, is shown in a subsequent acquired image associated with subsequent image information; and performing image processing to identify an obstacle shown in the subsequent acquired image in a case in which the subsequent acquired image has been determined to not show the identified obstacle.

In the fifth and sixth aspects the following processing is executed. Namely, image information relating to an acquired image of a vehicle, which has been determined that there is a possibility that an obstacle is shown, is received. In addition a duplication determination is made in order to determine whether or not any obstacle that has already been identified in a previous acquired image is shown in a newly received (i.e., subsequent) acquired image, and image processing to identify an obstacle is executed on newly acquired images that have been determined to not show any obstacle that has already been identified. For this reason, according to these aspects, in a device that performs image processing, with respect to an obstacle that has already been identified, because image processing is inhibited from being repeatedly performed on the same obstacle, it is possible to reduce the processing load in this device.

According to the present disclosure, it is possible to reduce a processing, load in a device that performs image processing in cases in which information relating to an obstacle is collected based on images acquired by a vehicle.

BRIEF DESCRIPTION OF THE DRAWINGS

Exemplary embodiments of the present disclosure will be described in detail based on the following figures, wherein.

DETAILED DESCRIPTION

Figure 1:
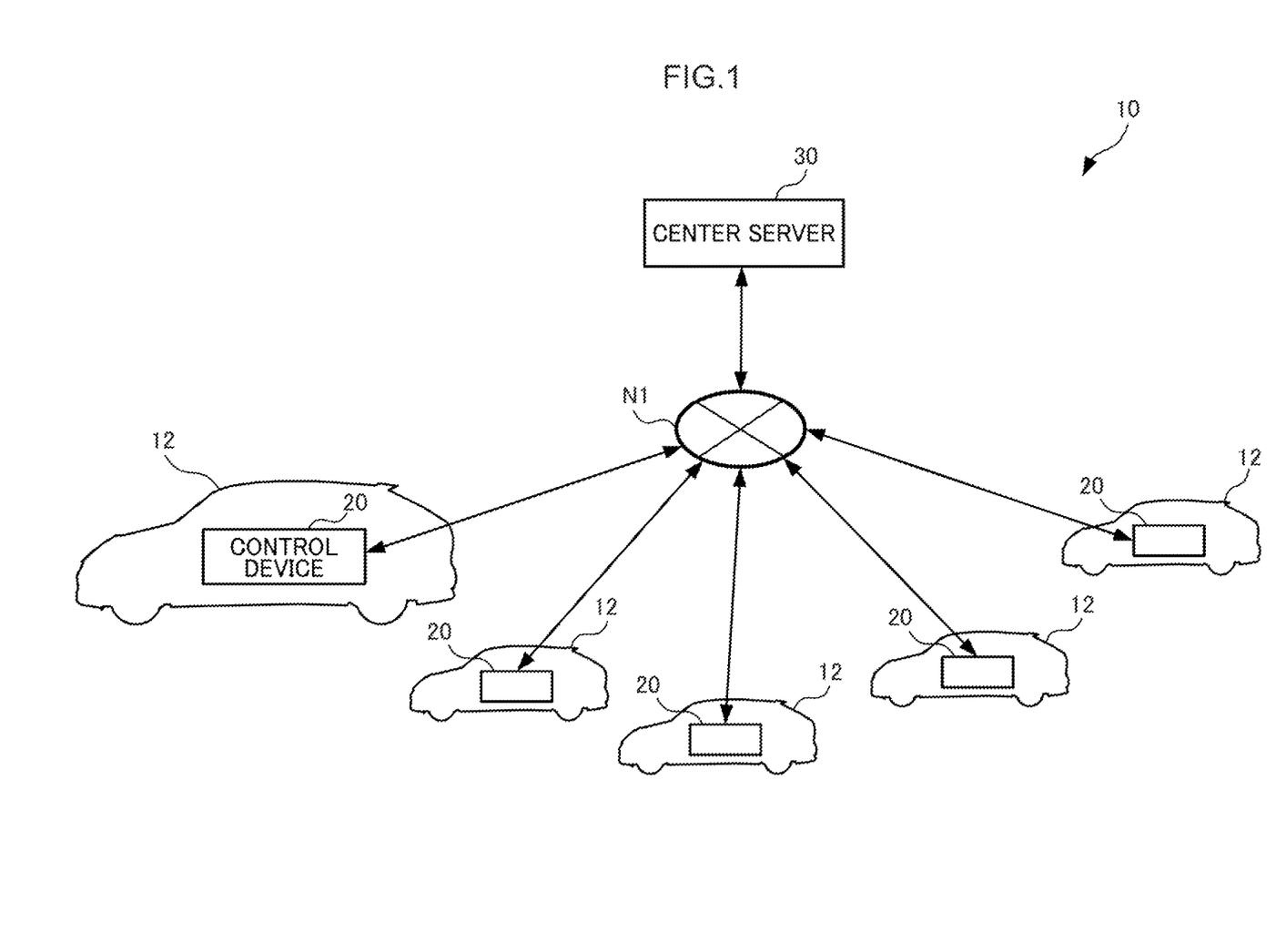
FIG. 1 is a view illustrating a schematic structure of an image processing system according to an exemplary embodiment.

As is illustrated in FIG. 1, an image processing system 10 of the present exemplary embodiment includes plural vehicles 12, and a center server 30 that serves as an image processing device. A control device 20 is mounted in each vehicle 12

Figure 2:
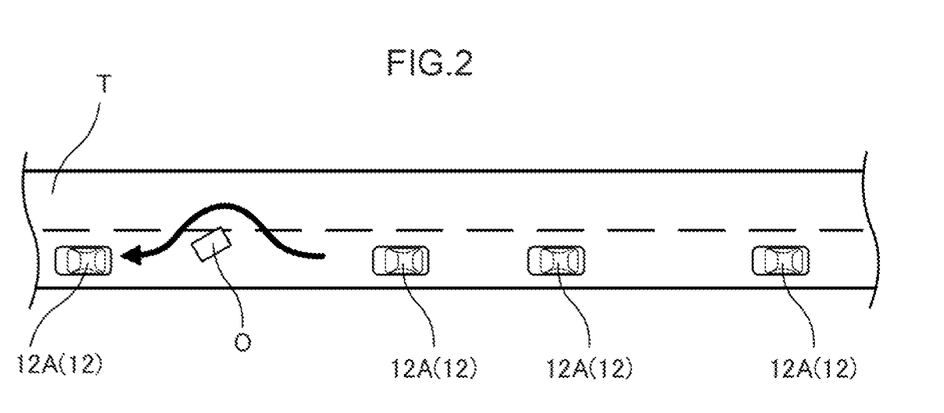
FIG. 2 is a view illustrating a passing vehicle that is passing an obstacle.

As is illustrated in FIG. 2, the vehicles 12 include passing vehicles 12A that are traveling along a travel route T, and peripheral vehicles 12B (see FIG. 10) that are traveling in the vicinity of the passing vehicles 12A. Here, the passing vehicles 12A are taken as being vehicles 12 that pass an obstacle O prior to this obstacle O being identified, and the vehicles B are taken as being vehicles 12 that approach close to the obstacle O after the obstacle O has been identified.

In the present exemplary embodiment, the passing vehicles A correspond to the 'vehicle' of the present disclosure, while the peripheral vehicles B correspond to the 'other vehicle' of the present disclosure. Note that the peripheral vehicles 12B are not limited to being following vehicles that are traveling in the same vehicle lane as the passing vehicles 12A on the travel route T, and include oncoming vehicles that are traveling in the opposite lane, and vehicles that are traveling on another travel route that is connected to the travel route T. Moreover, the obstacle O corresponds to the 'already identified obstacle' of the present disclosure.

The control device 20 and center server 30 of each vehicle 12 are mutually connected together via a network N1.

Note that, in the image processing system 10 illustrated in FIG. 1, five vehicles 12 are connected to a single center server 30, however, the present disclosure is not limited to this. In other words, either one or more vehicles 12 (more specifically, control devices 20) may be connected to a single center server 30.

(Vehicle)

Figure 3:
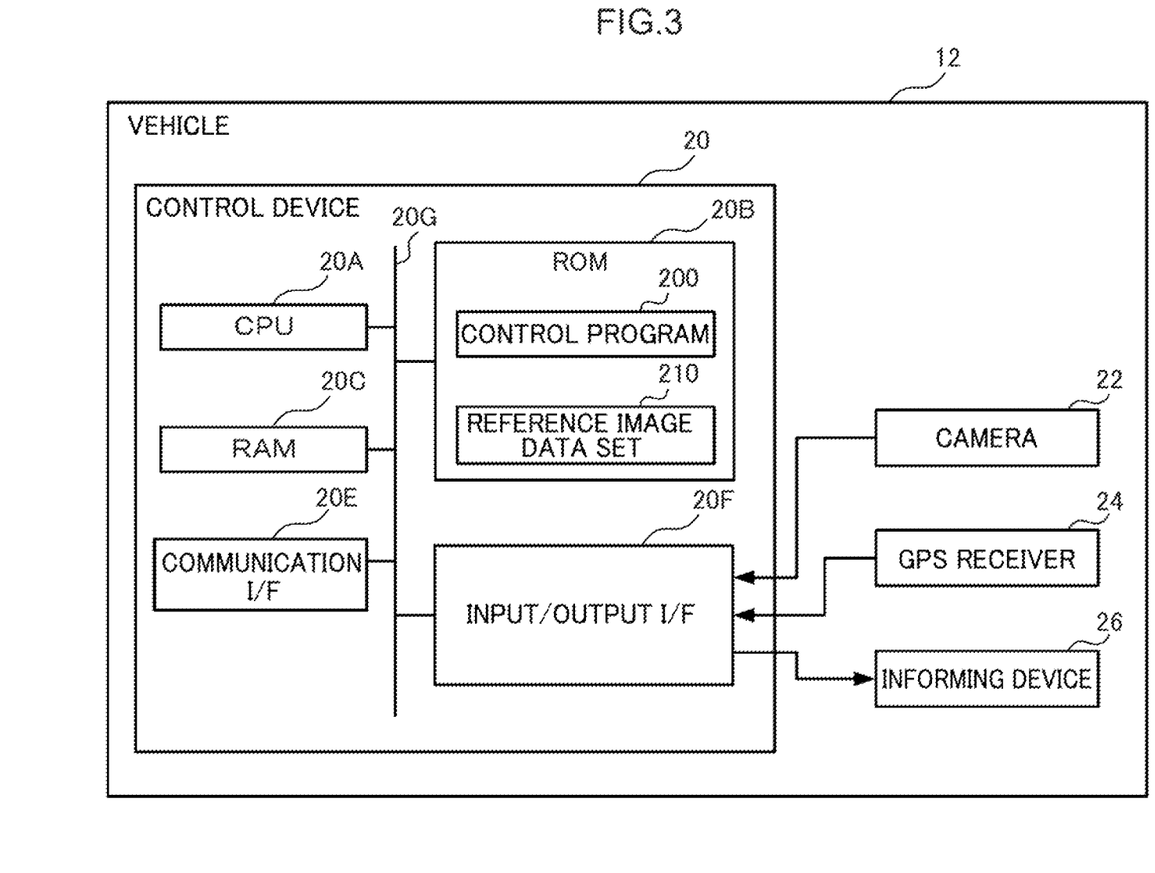
FIG. 3 is a block diagram illustrating a hardware structure of a vehicle of an exemplary embodiment.

As is illustrated in FIG. 3, each vehicle 12 according to the present exemplary embodiment includes a control device 20, a camera 22 which served as an image acquisition device, a Global Positioning System (GPS) receiver 24, and an informing device 26.

The control device 20 includes a Central Processing Unit (CPU) 20A, Read Only Memory (ROM) 20B, Random Access Memory (RAM) 20C, a communication interface (I/F) 20E, and an input/output interface (I/F) 20F. The CPU 20A, the ROM 20B, the RAM 20C, the communication I/F 20E, and the input/output I/F 20F are mutually connected via a bus 20G so as to be able to communicate with each other.

The CPU 20A performs tasks such as executing various types of programs and controlling the respective units. In other words, the CPU 20A reads out a program from the ROM 20B, and executes the program using the RAM 20C as a workspace.

The ROM 20B stores various types of programs and various types of data. The ROM 20B of the exemplary embodiment stores a control program 200 and reference image data set 210. The control program 200 is a program to execute estimation processing, which is described below. The reference image data set 210 includes plural sets of image information relating to known obstacles. Note that the reference image data set 210 may also be stored on a Secure Digital (SD) card or in a Universal Serial Bus (USB) memory or the like that is connected to the control device 20.

The RAM 20C serves as a workspace and temporarily stores programs or data.

The communication I/F 20E is an interface to connect to the network N1 in order to communicate with the center server 30. For this communication with the center server 30, a communication standard such as, for example, 5G, LTE, or Wi-Fi® may be used.

The input/output I/F 20F is an interface to communicate with the camera 22, the GPS receiver 24, and the informing device 26 that are mounted in the vehicle 12.

The camera 22 is fixed, for example, to an upper portion of a front windshield of the vehicle 12, and acquires images of an area in front of the vehicle 12. Note that it is also possible for the camera 22 to acquire images of an area to the rear of the vehicle 12 and inside the cabin of the vehicle 12 in addition to the area in front of the vehicle 12.

The GPS receiver 24 receives GPS signals from plural GPS satellites, and thereby measures the current position of the vehicle 12.

The informing device 26 is provided inside the vehicle cabin of the vehicle 12, and supplies information relating to obstacles O to a driver. The informing device 26 may be included in a meter unit or a car navigation system, or may be an independent device.

Figure 4:
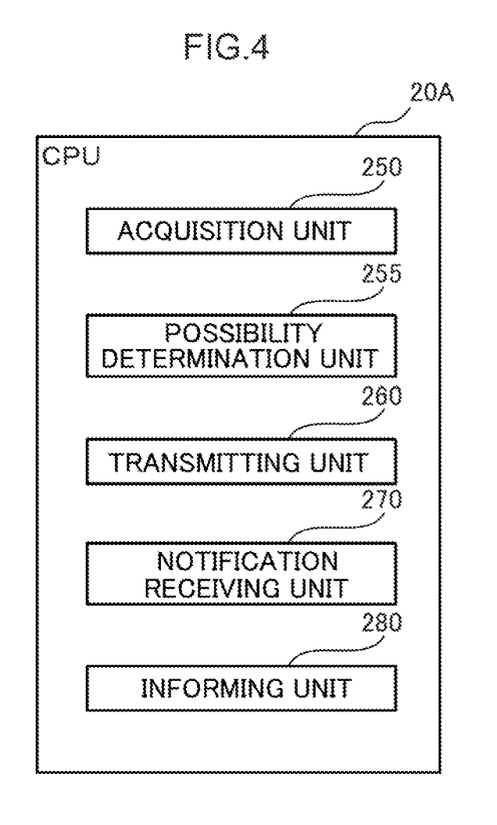
FIG. 4 is a block diagram illustrating an example of a functional structure of a CPU in a control device of an exemplary embodiment.

FIG. 4 is a block diagram illustrating an example of functional structures of the control device 20. Each functional structure is implemented as a result of the CPU 20A reading the control program 200 stored in the ROM 20B, and then executing the control program 200. The CPU 20A of the exemplary embodiment functions as an acquisition unit 250, a possibility determination unit 255, a transmitting unit 260, a notification receiving unit 270, and an informing unit 280 as a result of the control program 200 being executed.

The acquisition unit 250 has functions of acquiring image information relating to acquired images acquired by the camera 22, position information for the vehicle 12 detected by the GPS receiver 24, the current time and the like. In a case in which the camera 22 acquires an image of an obstacle on the travel route T, or in the event that an instruction to acquire an image has been given (for example, via an image acquisition switch being operated) by the driver, the acquisition unit 250 acquires information such as the image information, the position information, the current time and the like. Note that, in the exemplary embodiment, the position information for the passing vehicles 12A corresponds to the 'position information' of the present disclosure, and the position information for the peripheral vehicles 12B corresponds to the 'other position information' of the present disclosure. Moreover, the acquired images acquired in the exemplary embodiment may be videos or static images.

The possibility determination unit 255 has a function of determining whether or not there is a possibility of an obstacle being shown in an acquired image acquired by the camera 22 provided in the vehicle 12. The possibility determination unit 255 calculates a degree of similarity of an acquired image acquired by the camera 22 to each known obstacle that is stored in the reference image data set 210. Here, a commonly known method may be used for this calculation of the degree of similarity. For example, characteristic points in an acquired image and characteristic points of a known obstacle are extracted respectively, and the degree of similarity is calculated from the degree to which both sets of characteristic points match each other. The possibility determination unit 255 determines that there is a possibility that an obstacle is shown in an acquired image in a case in which the degree of similarity exceeds a predetermined threshold value.

The transmitting unit 260 has a function of transmitting image information acquired by the acquisition unit 250 to the center server 30. More specifically, transmitting unit 260 transmits to the center server 30 image information of acquired images which have been determined by the possibility determination unit 255 that there is a possibility that an obstacle is shown therein. Here, accompanying information corresponding to the image information is attached to the image information transmitted by the transmitting unit 260. The accompanying information includes position information for the vehicle 12 at the time of the acquired image has been acquired, information relating to a travel route T being traveled, a travel direction, and a travel time.

The notification receiving unit 270 has a function of receiving hazard information (described below) transmitted from the center server 30. If the vehicle 12 is a peripheral vehicle 12B, the hazard information is supplied from the center server 30 when the peripheral vehicle 12B has approached close to an obstacle O that has been identified based on an acquired image acquired by a passing vehicle 12A.

The informing unit 280 has a function of informing a driver that the driver is approaching close to the obstacle O based on the hazard information received from the center server 30. The informing unit 280 causes the informing device 26 to operate at the time when the hazard information is received.

(Center Server)

Figure 5:
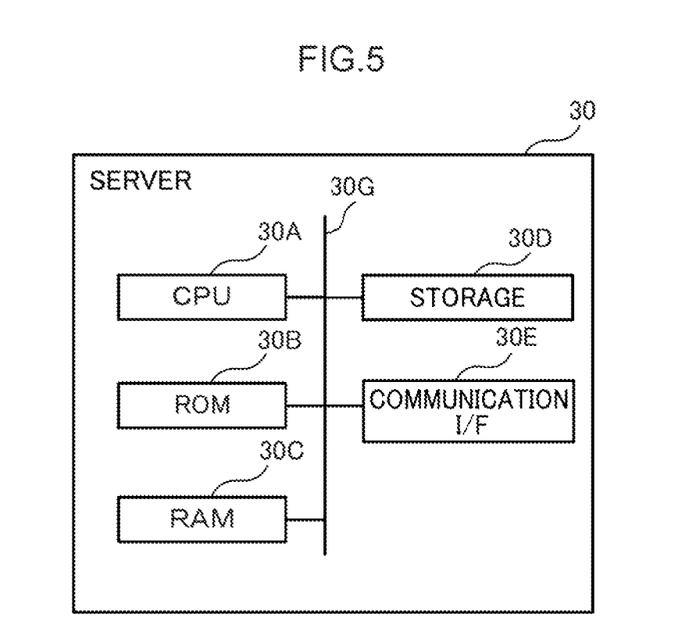
FIG. 5 is a block diagram illustrating a hardware structure of a center server of an exemplary embodiment.

As is illustrated in FIG. 5, the center server 30 includes a CPU 30A, ROM 30B, RAM 30C, storage 30D, and a communication I/F 30E. The CPU 30A, the ROM 30B, the RAM 30C, the storage 30D, and the communication I/F 30E are mutually connected via a bus 30G so as to be able to communicate with each other. Functions of the CPU 30A, the ROM 30B, the RAM 30C, and the communication I/F 30E are similar to those of the CPU 20A, the ROM 20B, the RAM 20C, and the communication I/F 20E of the above-described control device 20.

The storage 30D is formed by a Hard Disk Drive (HDD) or a Solid State Drive (SSD), and stores various types of programs and various types of data.

The CPU 30A reads out programs from the storage 30D, and executes the programs using the RAM 30C as a workspace.

Figure 6A:
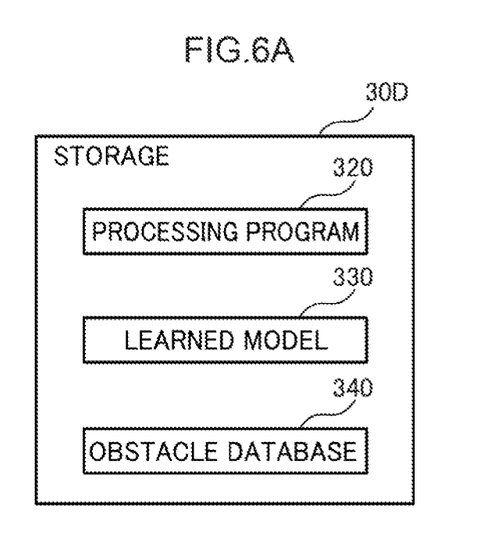
FIG. 6A is block diagram illustrating an example of data stored in a storage of the center server of an exemplary embodiment.
Figure 6B:
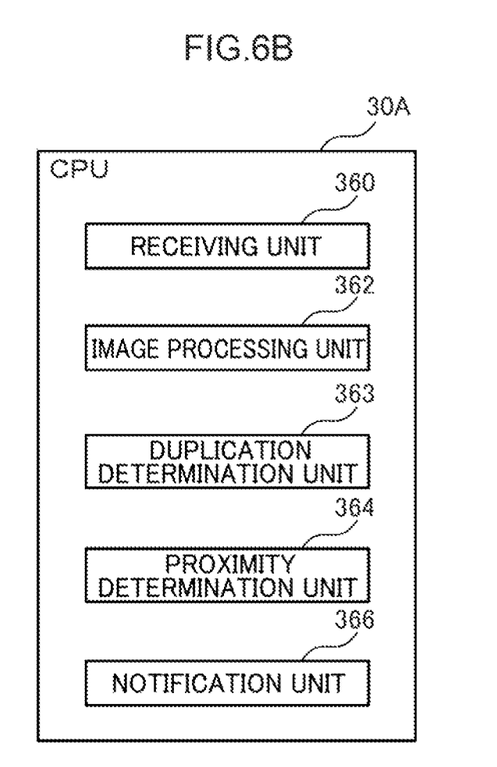
FIG. 6B is block diagram illustrating an example of a functional structure of a CPU in the center server of an exemplary embodiment.

As is illustrated in FIG. 6A, a processing program 320, a learned model 330, and an Obstacle database 340 are stored in the storage 30D of the center server 30 of the exemplary embodiment. The processing program 320 is a program to perform the informatization processing and notification processing described below. By executing the processing program 320, the CPU 30A functions as a receiving unit 360, an image processing unit 362, a duplication determination unit 363, a proximity determination unit 364, and a notification unit 366 that are illustrated in FIG. 6B.

The receiving unit 360 has a function of receiving image information that has been transmitted from one or more control devices 20, and to which accompanying information has been attached.

The image processing unit 362, which serves as a processing unit, has a function of performing image processing to identify obstacles in an acquired image. This image processing is executed by inputting image information into the learned model 330 that performs mechanical learning using previously known obstacles as teaching data. If, as a result of this image processing, an obstacle O is able to be identified, then obstacle information, i.e., information about the shape and size of the obstacle O, as well as position information for the obstacle O are stored in the obstacle database 340.

The duplication determination unit 363 has a function of determining whether or not an already identified obstacle O is shown in an acquired image associated with image information received by the receiving unit 360. More specifically, the duplication determination unit 363 extracts the accompanying information from the received new image information, and searches as to whether or not the same position information and the same travel route T as those for the identified obstacle O, and information for a travel time approximately similar to that for the identified obstacle O, are contained in the new acquired image associated with the new image information. Note that the new image information corresponds to the 'subsequent image information' of the present disclosure, while the new acquired image corresponds to the 'subsequent acquired image' of the present disclosure.

As a result of this search, the duplication determination unit 363 determines that the acquired image showing an obstacle that is at the same position, is on the same travel route T, and is present within the same time period as the identified obstacle O, to be a duplicate image showing the identified obstacle O. The image processing by the image processing unit 362 is not performed on the duplicate image. Moreover, the duplication determination unit 363 does not store the image information corresponding to the duplicate image in the storage 30D, but instead deletes it from the RAM 30B. Note that the 'tune period', which serves as one of the aforementioned determination conditions may be set in unit widths of several hours such as a morning or an evening, or in time widths of approximately several tens of minutes, Even if the acquired image has the same position information as the identified obstacle O, in a case in which the time period does not match, then image processing is performed once again.

The proximity determination unit 364 has a function of determining whether or not a peripheral vehicle 12B has approached close to the obstacle O. The proximity determination unit 364 determines that a peripheral vehicle B has approached close to the obstacle O in a case in which the peripheral vehicle B is present within a predetermined distance (for example, within the range of distance R; see FIG. 10) from the position information attached to the obstacle O.

The notification unit 366 has a function of supplying hazard information to one or more peripheral vehicles 12B. The notification unit 366 of the exemplary embodiment supplies hazard information to one or more peripherals vehicle 12B in a case in which the proximity determination unit 364 determines that that the one or more peripheral vehicle 12B have approached close to the obstacle O. In other words, the center server 30 transmits hazard information to the control device 20 of the peripheral vehicle 12B.

(Control Flow)

An example of the flow of processing executed in the image processing system 10 of the exemplary embodiment will now be described using the flowcharts illustrated in FIG. 7 through FIG. 9.

Firstly, a description will be given of the flow of estimation processing executed in the control device 20 of a passing vehicle 12A (see FIG. 2) that has traveled past while avoiding an obstacle O that has fallen onto the travel route T.

Figure 7:
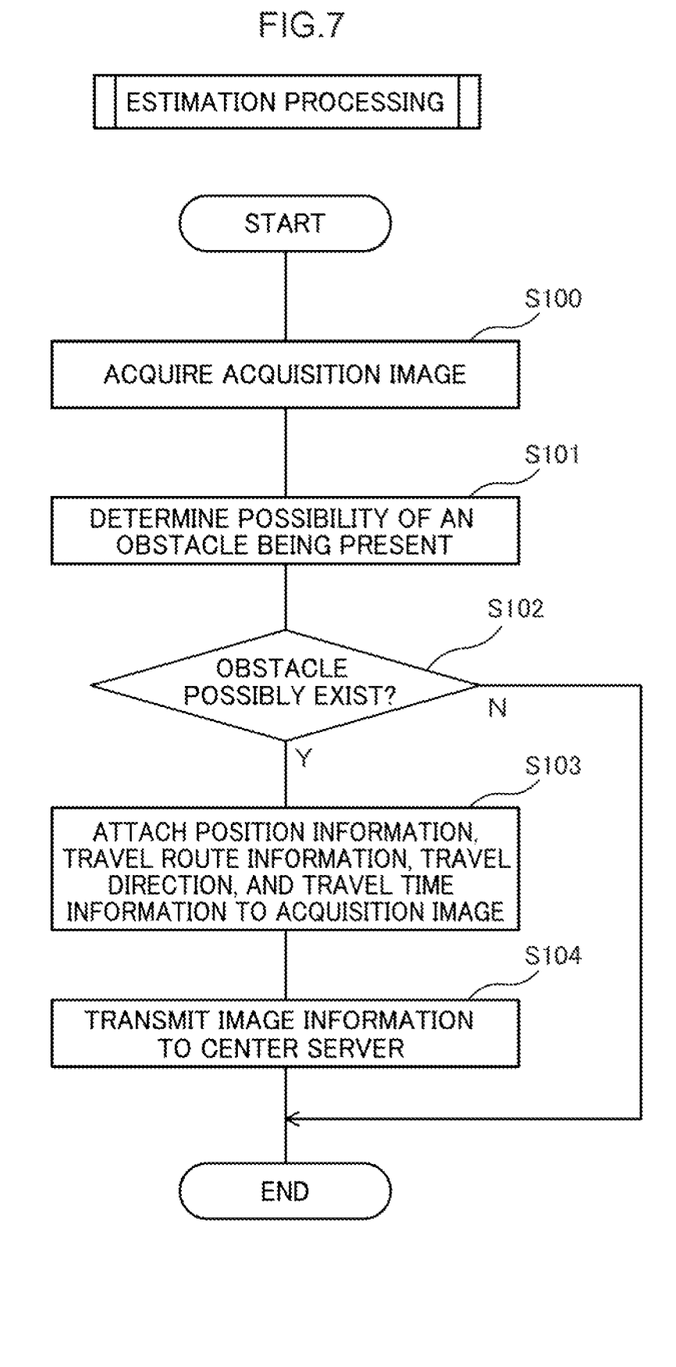
FIG. 7 is a flowchart illustrating a flow of estimation processing executed in the control device of an exemplary embodiment.

In step S100 in FIG. 7, the CPU 20A acquires an acquired image from the camera 22.

In step S101, the CPU 20A determines the possibility of whether or not an obstacle is shown in the acquired image. More specifically, the CPU 20A calculates the degree of similarity of the acquired image acquired by the camera 22 to each of one or more known obstacles stored in the reference image data set 210. Next, if this degree of similarity exceeds a predetermined threshold value, the CPU 20A determines that there is a possibility that an obstacle is shown in the acquired image. Note that it is not necessary for the obstacle itself that is considered possibly present to be identified at this time.

In step S102, the CPU 20A makes a determination as to whether or not there is a possibility that an obstacle is shown in, the acquired image. If the CPU 20A determines that there is a possibility that an obstacle is shown in the acquired image, the routine moves to step S103. If the CPU 20A determines that there is no possibility that an obstacle is shown in the acquired image, the estimation processing is ended.

In step S103, the CPU 20A attaches position information for the vehicle 12 (i.e., for the passing vehicle 12A), information about the travel route T being traveled, the travel direction, and the travel time to the acquired image as accompanying information.

In step S104, the CPU 20A transmits the image information to which the accompanying information has been attached to the center server 30. The estimation processing is then ended.

Next, the flow of informatization processing executed in the center server 30 will be described.

Figure 8:
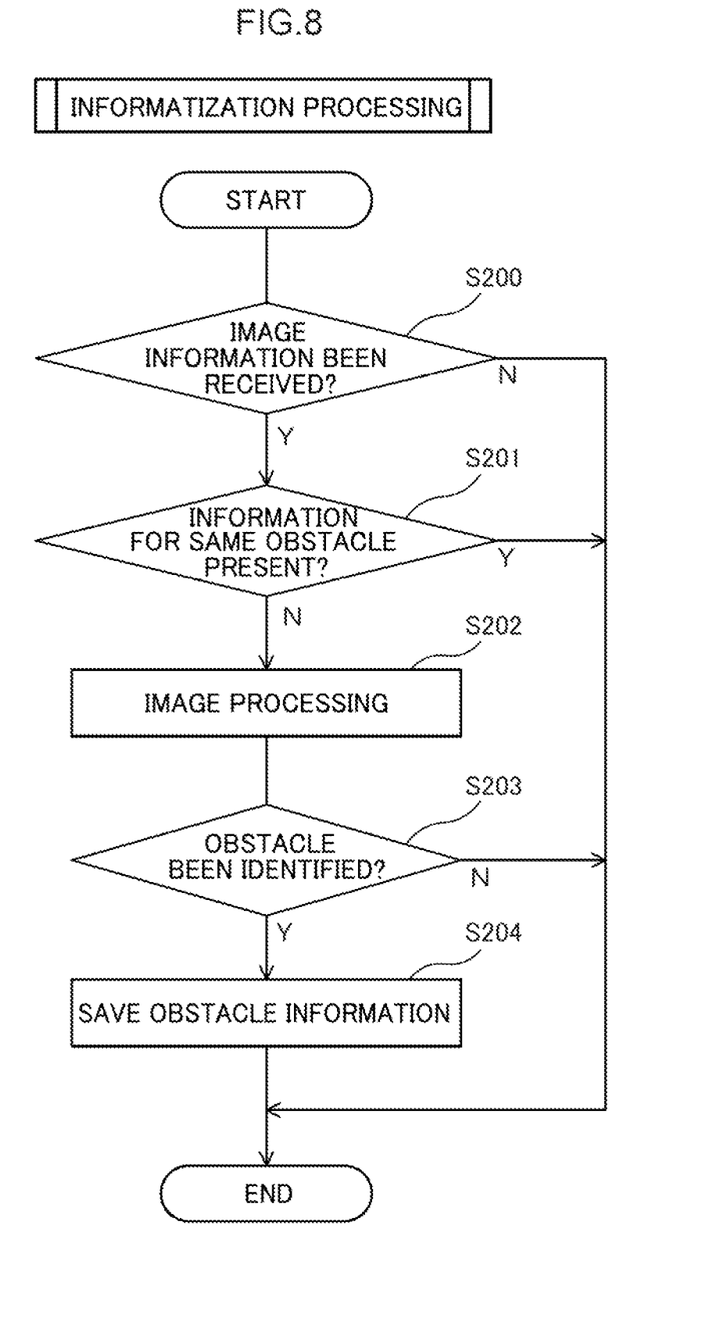
FIG. 8 is a flowchart illustrating a flow of informatization processing executed in the center server of an exemplary embodiment.

In step S200 illustrated in FIG. 8, the CPU 30A determines as to whether or not image information has been received from a control device 20. If the CPU 30A determines that image information has been received, the routine moves to step S201. If, however, the CPU 30A determines that image information has not been received, then the informatization processing is ended.

In step S201, the CPU 30A determines whether or not the received image information contains information about an obstacle that is the same as any of one or more already identified obstacles O. More specifically, the CPU 30A makes a determination as to whether or not the received image information corresponds to a duplicate image showing an obstacle that is present in the same position, on the same travel route T, and in the same time period as any of the already identified obstacles O. If the CPU 30A determines that the received image information contains information about an obstacle that is the same as any of the already identified obstacles O, then the informatization processing is ended. In contrast, if the CPU 30A determines that the received image information does not contain information about an obstacle that is the same as any of the already identified obstacle O, then the routine moves to step S202.

In step S202, the CPU 30A performs image processing on the received image information. In other words, the CPU 30A inputs the image information into the learned model 330, and attempts to identify a new obstacle O.

In step S203, the CPU 30A makes a determination as to whether or not a new obstacle O has been identified. If the CPU 30A determines that a new obstacle O has been identified, the routine moves to step S204. If, however, the CPU 30A determines that a new obstacle O has not been identified, then the informatization processing is ended.

In step S204, the CPU 30A stores obstacle information. More specifically, the CPU 30A stores information relating to the type and size of the newly identified obstacle O, and position information for the newly identified obstacle O in the obstacle database 340 as the obstacle information. The informatization processing is then ended.

Note that in the informatization processing, if information about an obstacle that is the same as any of the one or more obstacles O stored in the obstacle database 340 is not received for a particular period of time, then it may be assumed that this obstacle O has already been removed from the travel route T, and the information relating to this obstacle O may be deleted from the obstacle database 340.

After the obstacle O has been identified, the flow of notification processing described below is executed in the center server 30.

Figure 9:
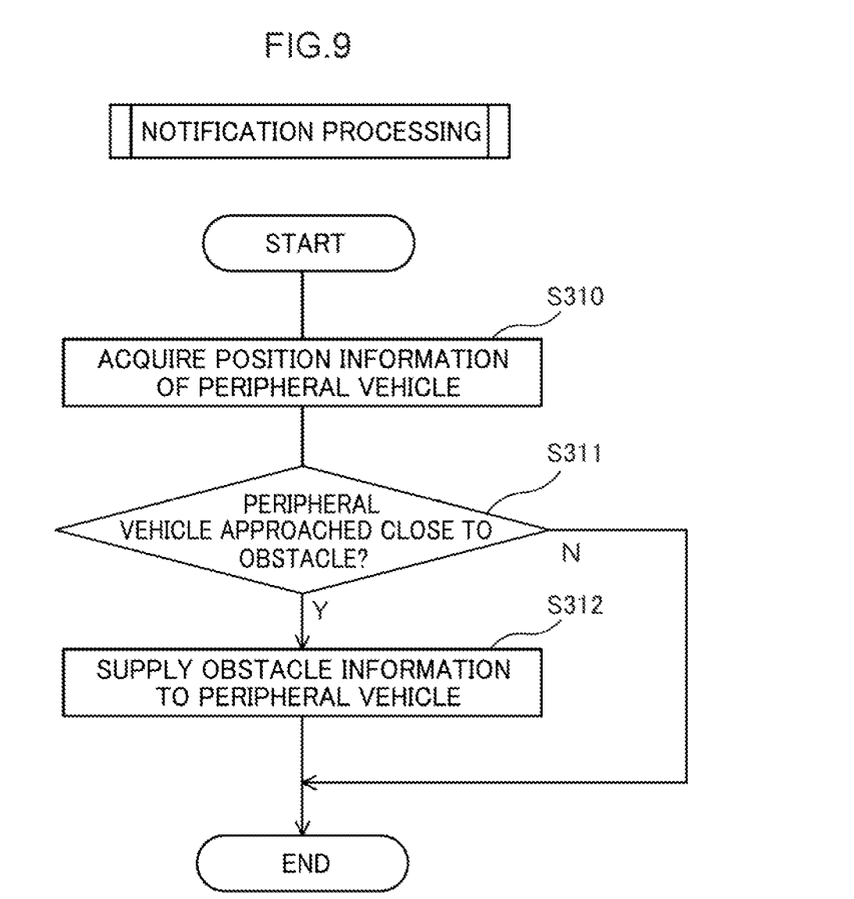
FIG. 9 is a flowchart illustrating a flow of notification processing executed in the center server of an exemplary embodiment.

In step S310 in FIG. 9, the CPU 30A acquires position information for one or more peripheral vehicles 12B.

Figure 10:
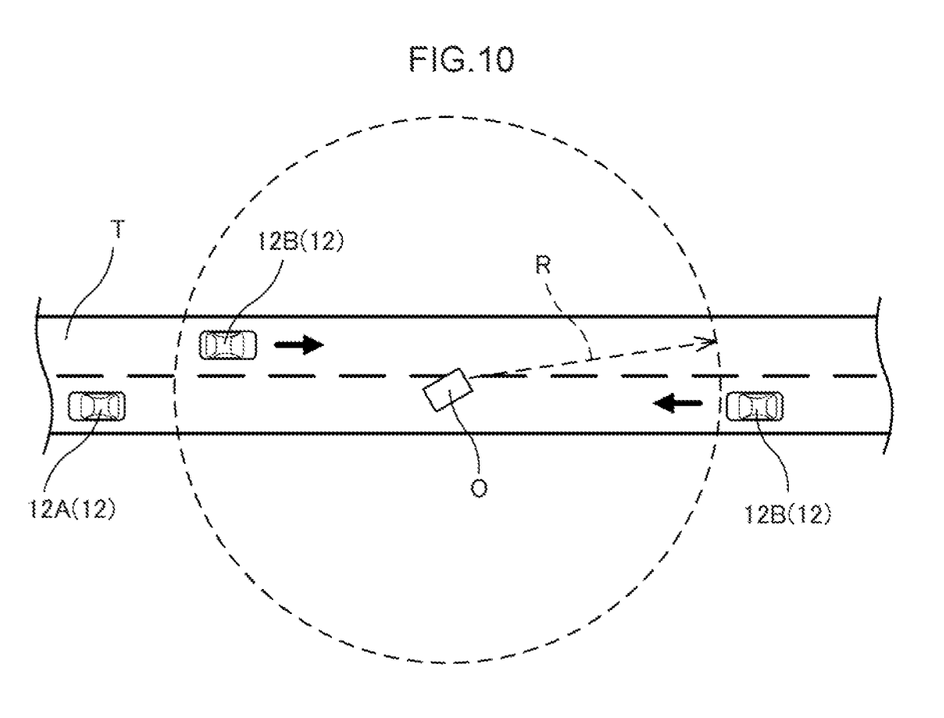
FIG. 10 is a view illustrating a state in which notification processing is being executed.

In step S311, the CPU 30A makes a determination as to whether or not any of the one or more peripheral vehicle 12B has approached dose to the obstacle O. For example, as illustrated in FIG. 10, in a case in which it is determined, based on the obstacle information stored in the obstacle database 340, that there is an obstacle O that may obstruct the travel of a vehicle 12 on the travel route T, such as timber pieces, cardboard boxes, container boxes or the like, then a determination is made as to whether or not any peripheral vehicle 12B is present within the range of the distance R from this obstacle O. If the CPU 30A determines that any peripheral vehicle 12B has approached close to the obstacle O for which the obstacle information is stored in the obstacle database 340, then the routine moves to step S312 in FIG. 9. If, on the other hand, the CPU 30A determines that there is no peripheral vehicle 12B approaching close to the obstacle O, then the notification processing is ended.

In step S312, the CPU 30A sends the obstacle information of the obstacle O to the peripheral vehicle 12B that has approached close to the obstacle O as hazard information. The notification processing is then ended.

As a result of the above-described notification processing, the driver's attention may be directed towards the obstacle O in the peripheral vehicle 12B that has received the obstacle information.

Note that if the control device 20 of the peripheral device 12B does not detect the obstacle O on the travel route T in spite of the fact that it has received the obstacle information, then notification may be sent to the center server 30 informing that the obstacle O is not present. Upon receiving this notification, the center server 30 may delete the obstacle information relating to the obstacle O that is no longer present from the obstacle database 340.

SUMMARY

The image processing system 10 of the exemplary embodiment is configured by a combination of the control device 20 mounted in the vehicle 12 and the center server 30. In the control device 20, the possibility determination unit 255 determines whether or not there is a possibility that an obstacle is shown in an acquired image, and image information relating to an acquired image that has been determined to show an obstacle is transmitted to the center server 30. In the center server 30, the image processing unit 362 executes image processing and identifies the obstacle shown in the acquired image.

As described above, according to the image processing system 10 of the exemplary embodiment, image information of an acquired image that has been determined to not show an obstacle is not transmitted to the center server 30 that performs image processing. In other words, because not all of the image information of the acquired images from all of the passing vehicles 12A is sent to the center server 30, it is possible to inhibit processing delay and to reduce the processing load in the center server 30.

Moreover, in the exemplary embodiment, in the center server 30 the duplication determination unit 363 determines whether or not any already identified obstacle O is shown in a newly received acquired image, and the image processing unit 362 executes image processing on an acquired image that has been determined to not show any already identified obstacle O. Accordingly, according to the exemplary embodiment, regarding any obstacle O that has already been identified, it is possible to inhibit image processing from being repeatedly performed on the same obstacle. Because of this, the processing load in the center server 30 may be reduced.

Moreover, in the exemplary embodiment, in the center server 30, the duplication determination unit 363 considers the accompanying information attached to an acquired image and determines as to whether or not an already identified obstacle O is shown in the acquired image. According to the exemplary embodiment, it is possible to improve the accuracy of identifying an obstacle, and the processing load in the center server 30 may be reduced.

Note that if the accuracy of the identification of an obstacle O that has been identified first by the image processing performed in the center server 30 is poor, then, in spite of the fact that the obstacle O that has already been identified is shown in a newly received acquired image, there is a possibility that the duplication determination unit 363 will determine that the already identified obstacle O is not shown therein. In this case, the image processing is executed once again, and the obstacle O is identified once again. Accordingly, as a result of the image processing being executed once more time using an acquired image having a higher resolution, it is possible to improve the accuracy of the identification relating to the position, shape, and size and the like of an obstacle O.

Moreover, in the image processing system 10 of the exemplary embodiment, the receiving unit 360 of the center server 30 receives position information for one or more peripheral vehicles 128, and the proximity determination unit 364 determines whether or not any of the one or inure peripheral vehicles 12B have approached close to any obstacle O, based on the obstacle information stored in the obstacle database 340. If it is determined that a peripheral vehicle 12B has approached close to an obstacle O for which the obstacle information is stored in the obstacle database 340, the notification unit 366 sends hazard information to the peripheral vehicle 12B. According to the exemplary embodiment, it is possible to direct the attention of the driver of the peripheral vehicle 12B towards an obstacle O on the travel route T based on position information for the obstacle O stored in the obstacle database 340.

(Remarks)

The image processing system 10 of the exemplary embodiment has been described that it is configured by a combination of the control device 20 mounted in the vehicle 12 and the center server 30, however, the present disclosure is not limited to this. For example, one or more edge servers that relay communication between the control device 20 and the center server 30 may be provided between these two components. In this case, the edge server may be installed in each of the plural areas traveled through by the vehicles 12.

Moreover, if the edge servers are provided, the control device 20 mounted in the vehicle 12 may determine whether or not there is a possibility that an obstacle is shown in an acquired image, and each of the edge servers may determine whether or not any already identified obstacle O is shown in a newly received acquired image. In other words, the functions of the duplication determination unit 363 may be given to the edge servers.

Moreover, in the exemplary embodiment, whether or not there is a possibility that an obstacle is shown in an acquired image is determined at the control device 20 mounted in each of the vehicles 12. However, if, as is described above, edge servers are installed, image information to which accompanying information has been attached may be transmitted from the control device 20 to any one of the edge servers, and the edge server, which received the image information, may determine whether or not there is a possibility that an obstacle is shown in an acquired image related to the received image information. In this case, the processing load may be reduced not only in the center server 30, but also in the control device 20.

Note that, in the above-described exemplary embodiment, various types of processing are executed by the CPUs 20A and 30A reading out a software (i.e., a program). However, the disclosure is not limited to this and, instead, the processing may be executed by various types of processor other than a CPU. Examples of other types of processor in this case include a Programmable Logic Device (PLD) such as a Field-Programmable Gate Array (FPGA), whose circuit structure may be altered after manufacturing, and a dedicated electrical circuit such as an Application Specific Integrated Circuit (ASIC), which is a processor having a circuit structure that is designed specifically in order to execute a particular processing. In addition, the above-described processing may be executed by a single processor among these various types of processors, or by a combination of two or more processors that are either the same type or are mutually different types (for example by plural FPGAs or by a combination of a CPU and an FPGA). Furthermore, the hardware structures of these different types of processor's are, specifically, electrical circuits obtained by combining circuit elements such as semiconductor elements and the like.

Moreover, in the above-described exemplary embodiment, a mode is described in which each program is stored (i.e., is installed) in advance on a non-transitory recording medium capable of being read by a computer. For example, in the vehicle control unit 20 the control program 200 is stored in advance in the ROM 20B. Moreover, for example, the processing program 320 in the center server 30 is stored in advance in the storage 30D. However, the present disclosure is not limited to this, and it is also possible for each program to be provided by being stored on a non-transitory storage medium such as a Compact Disc Read Only Memory (CD-ROM), a Digital Versatile Disc Read Only Memory (DVD-ROM), and a Universal Serial Bus (USB) memory. Moreover, each program may alternatively be downloaded from an external device via a network.

The processing flows described in the forgoing exemplary embodiment are also merely examples thereof, and insofar as this does not cause a departure from the spirit or scope of the present disclosure, steps that are not required may be deleted, new steps may be added, or the sequence of the steps may be altered.

An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. An image processing system, comprising:
    a storage that stores an obstacle database maintaining obstacle information including at least position information of an obstacle;
    one or more memories; and
    one or more processors coupled to the one or more memories, the one or more processors being configured to:
    determine whether there is a possibility that an obstacle is shown in an acquired image that is acquired by an image acquisition device provided at a vehicle,
    based upon a determination that there is the possibility that an obstacle is shown in the acquired image, attach accompanying information to image information relating to the acquired image, and transmit, from the vehicle, the image information relating to the acquired image the accompanying information including at least position information where the image was acquired,
    receive the image information including the accompanying information from a plurality of vehicles,
    determine, based on the accompanying information of the received image information, whether or not an identified obstacle, which is an obstacle corresponding to the obstacle information stored in the obstacle database, is shown in the acquired image associated with the received image information by referring to the obstacle database, and
    perform image processing to identify an obstacle shown in the acquired image in a case in which the acquired image has been determined to not show the identified obstacle.

2. The image processing system according to claim 1, wherein the one or more processors are further configured to:
    receive other position information associated with another vehicle,
    determine whether the other vehicle having the other position information has approached the identified obstacle, and
    send hazard information to the other vehicle in a case in which it is determined that the other vehicle has approached the identified obstacle.

3. An image processing method, comprising:
    storing, in advance, an obstacle database maintaining obstacle information including at least position information of an obstacle;
    determining whether there is a possibility that an obstacle is shown in an acquired image that is acquired by an image acquisition device provided at a vehicle;
    based upon a determination that there is the possibility that the acquired image shows an obstacle, attaching accompanying information to image information relating to the acquired image, and transmitting, from the vehicle to a server, the image information relating to the acquired image, the accompanying information including at least position information where the image was acquired;
    receiving, by the server, the image information including the accompanying information from a plurality of vehicles;
    determining, by the server, based on the accompanying information of the received image information, whether or not an identified obstacle, which is an obstacle corresponding to the obstacle information stored in the obstacle database, is shown in the acquired image associated with the received image information by referring to the obstacle database; and
    performing image processing to identify an obstacle shown in the acquired image in a case in which the acquired image has been determined to not show the identified obstacle.

4. A non-transitory storage medium storing a program executable by a computer to perform image processing, the image processing comprising:
    storing, in advance, an obstacle database maintaining obstacle information including at least position information of an obstacle;
    determining whether there is a possibility that an obstacle is shown in an acquired image that is acquired by an image acquisition device provided at a vehicle;
    based upon a determination that there is a possibility that the acquired image shows an obstacle, attaching accompanying information to image information relating to the acquired image, and transmitting, from the vehicle to a server, the image information relating to the acquired image, the accompanying information including at least position information where the image was acquired;
    receiving, by the server, the image information including the accompanying information from a plurality of vehicles;
    determining, by the server, based on the accompanying information of the received image information, whether or not an identified obstacle, which is an obstacle corresponding to the obstacle information stored in the obstacle database, is shown in the acquired image associated with the received image information, by referring to the obstacle database; and
    performing image processing to identify an obstacle shown in the acquired image in a case in which the acquired image has been determined to not show the identified obstacle.

5. An image processing device, comprising:
    a storage that stores an obstacle database maintaining obstacle information including at least position information of an obstacle;
    a memory; and
    a processor coupled to the memory, the processor being configured to:
    receive, from a plurality of vehicles, image information relating to acquired images, which are acquired by the plurality of vehicles, in which it has been determined that there is a possibility that an obstacle is shown in the acquired images, the image information including accompanying information including at least position information where the images were acquired;
    determine, based on the accompanying information of the received image information, whether or not an identified obstacle, which is an obstacle corresponding to the obstacle information stored in the obstacle database, is shown in the acquired image associated with the received image information by referring to the obstacle database; and perform image processing to identify an obstacle shown in the acquired image in a case in which the acquired image has been determined to not show the identified obstacle.

6. An image processing method, comprising:
storing, in advance, an obstacle database maintaining obstacle information including at least position information of an obstacle;
receiving, from a plurality of vehicles, image information relating to acquired images, which are acquired by the plurality of vehicles, in which it has been determined that there is a possibility that an obstacle is shown in the acquired images, the image information including accompanying information including at least position information where the images were acquired;
determining, based on the accompanying information of the received image information, whether or not an identified obstacle, which is an obstacle corresponding to the obstacle information stored in the obstacle database, is shown in the acquired image associated with the received image information by referring to the obstacle database; and
performing image processing to identify an obstacle shown in the acquired image in a case in which the acquired image has been determined to not show the identified obstacle.

7. A non-transitory storage medium storing a program executable by a computer to perform image processing, the image processing comprising:
storing, in advance, an obstacle database maintaining obstacle information including at least position information of an obstacle;
receiving, from a plurality of vehicles, image information relating to acquired images, which are acquired by the plurality of vehicles, in which it has been determined that there is a possibility that an obstacle is shown in the acquired images, the image information including accompanying information including at least position information where the images were acquired;
determining, based on the accompanying information of the received image information, whether or not an identified obstacle, which is an obstacle corresponding to the obstacle information stored in the obstacle database, is shown in the acquired image associated with the received image information by referring to the obstacle database; and
performing image processing to identify an obstacle shown in the acquired image, in a case in which the acquired image has been determined to not show the identified obstacle.

8. The image processing system according to claim 1, wherein the one or more processors are further configured to: store information of the obstacle identified by the image processing in the obstacle database as new obstacle information.

9. The image processing system according to claim 1, wherein the obstacle information further includes a shape and a size of the obstacle, and the image processing identifies the obstacle information of the obstacle shown in the acquired image.

10. The image processing system according to claim 1, wherein the accompanying information further includes information of a travel route, a travel direction, and a time when the image was acquired and
the one or more processors are further configured to determine whether or not an identified obstacle is shown in the acquired image by searching the obstacle database as to whether or not obstacle information including the same position information, the same travel route and approximately similar time as the accompanying information is present.

\* \* \* \* \*